(12) United States Patent
Repp (10) Patent No.: US 12,221,183 B2
(45) Date of Patent: Feb. 11, 2025

(54) TRAILER AND INTERCHANGEABLE MODULES

(71) Applicant: Terry Repp, Moravia, IA (US)

(72) Inventor: Terry Repp, Moravia, IA (US)

( * ) Notice: Subject to any disclaimer, the term of this patent is extended or adjusted under 35 U.S.C. 154(b) by 157 days.

(21) Appl. No.: 17/190,205

(22) Filed: Mar. 2, 2021

(65) Prior Publication Data

US 2021/0276646 A1 Sep. 9, 2021

Related U.S. Application Data

(60) Provisional application No. 62/985,931, filed on Mar. 6, 2020.

(51) Int. Cl.
*B62D 63/06* (2006.01)
*B62D 63/08* (2006.01)
*B62D 65/04* (2006.01)

(52) U.S. Cl.
CPC .......... *B62D 63/062* (2013.01); *B62D 63/08* (2013.01); *B62D 65/04* (2013.01)

(58) Field of Classification Search
CPC ........ Y10S 280/08; B60P 1/6418; B60P 7/08; B60P 7/10; B60P 7/13; B60P 1/6481; B60P 1/649; B60P 1/6427; B60P 3/32; B60P 1/64; B62D 63/062; B62D 63/08; B62D 63/00
See application file for complete search history.

(56) References Cited

U.S. PATENT DOCUMENTS

| 1,966,492 | A | * | 7/1934 | Fildes | B60P 3/22 410/70 |
| 1,988,651 | A | * | 1/1935 | Fildes | B60P 7/13 410/72 |
| 2,461,577 | A | * | 2/1949 | Stark, Jr. | B62D 53/067 280/30 |
| 2,605,064 | A | * | 7/1952 | Davis | B64D 9/00 410/104 |
| 2,962,295 | A | * | 11/1960 | Tenenbaum | B62D 53/068 280/407.1 |
| 2,981,210 | A | * | 4/1961 | Krueger | B60P 1/6427 105/215.1 |
| 3,096,993 | A | * | 7/1963 | Mckay | B62D 53/068 280/407.1 |
| 3,140,005 | A | * | 7/1964 | Hand | B65D 90/143 220/1.5 |
| 3,259,400 | A | * | 7/1966 | Tantlinger | B60P 7/13 280/8 |
| 3,317,219 | A | * | 5/1967 | Hindin | B60P 1/6481 280/8 |
| 3,614,153 | A | * | 10/1971 | Tantlinger | B60P 1/6481 410/82 |
| 3,622,178 | A | * | 11/1971 | Tantlinger | B60S 9/16 280/789 |
| 3,655,214 | A | * | 4/1972 | Lane | B62D 53/068 280/43.23 |
| 3,722,948 | A | * | 3/1973 | Walsh | B60P 3/42 414/500 |
| 4,266,820 | A | * | 5/1981 | Whaley | B60P 7/132 410/82 |

(Continued)

*Primary Examiner* — Timothy Wilhelm
(74) *Attorney, Agent, or Firm* — Vander Velden Law Firm, LLC (57) ABSTRACT

A trailer and interchangeable modules for transporting objects on public and private roadways are provided.

2 Claims, 9 Drawing Sheets

(56) References Cited

U.S. PATENT DOCUMENTS

| | | | | |
|---|---|---|---|---|
| 4,319,863 A * | 3/1982 | Voges | B62D 53/062 | 414/480 |
| 4,699,558 A * | 10/1987 | Hagge | B60P 1/027 | 280/43.23 |
| 4,750,855 A * | 6/1988 | Anderson | B60P 3/42 | 296/35.3 |
| 4,992,669 A * | 2/1991 | Parmley | F01B 1/12 | 290/1 R |
| 5,127,781 A * | 7/1992 | Roarty | B62D 53/067 | 410/82 |
| 5,192,176 A * | 3/1993 | Roberts | B65D 90/0013 | 296/24.44 |
| 5,417,540 A * | 5/1995 | Cox | B60P 1/6427 | 414/537 |
| 5,507,514 A * | 4/1996 | Jacques | B62D 53/067 | 280/411.1 |
| 5,575,599 A * | 11/1996 | Conlee | B60P 7/13 | 410/70 |
| 5,618,138 A * | 4/1997 | Lockhart | B60P 7/13 | 410/80 |
| 5,678,715 A * | 10/1997 | Sjostedt | B65D 90/022 | 220/1.5 |
| 5,716,071 A * | 2/1998 | Stanley | B62D 53/00 | 33/708 |
| 5,829,946 A * | 11/1998 | McNeilus | B60P 1/34 | 410/80 |
| 5,839,864 A * | 11/1998 | Reynard | B60P 7/13 | 410/70 |
| 5,906,417 A * | 5/1999 | Golden | B60P 1/165 | 296/183.2 |
| 5,961,263 A * | 10/1999 | Nunez | B60P 7/083 | 410/104 |
| 6,106,072 A * | 8/2000 | Lutter, Jr. | B60P 1/165 | 298/17.5 |
| 6,149,370 A * | 11/2000 | DiBartolomeo | B60P 7/13 | 296/3 |
| 6,299,008 B1 * | 10/2001 | Payne | B65D 90/008 | 220/1.5 |
| 6,322,127 B1 * | 11/2001 | Masterson | B65D 90/14 | 296/26.04 |
| 6,390,742 B1 * | 5/2002 | Breeden | B65D 90/0013 | 410/82 |
| 6,491,485 B2 * | 12/2002 | Zavitz | B61D 45/00 | 410/94 |
| 6,626,621 B1 * | 9/2003 | Hugg | B60P 7/083 | 410/106 |
| 6,709,208 B1 * | 3/2004 | Lyrstrand | B63B 25/004 | 410/115 |
| 6,824,338 B2 * | 11/2004 | Looker | B64D 9/003 | 410/82 |
| 7,066,697 B2 * | 6/2006 | Guilkey | B60P 7/10 | 410/35 |
| 7,137,764 B2 * | 11/2006 | Johnson | B62D 33/02 | 410/101 |
| 7,334,972 B2 * | 2/2008 | Cash | B60P 7/083 | 410/116 |
| 7,380,873 B2 * | 6/2008 | Shoemaker | B60J 5/108 | 296/61 |
| 7,507,061 B2 * | 3/2009 | Wells | B65D 88/129 | 410/46 |
| 7,543,842 B1 * | 6/2009 | Fiorini | B62B 3/025 | 280/43 |
| 7,682,115 B1 * | 3/2010 | Jay | B60P 3/07 | 410/101 |
| 8,033,586 B2 * | 10/2011 | Hastings | B66D 3/02 | 296/3 |
| 8,157,492 B2 * | 4/2012 | Franzen | B60P 7/13 | 410/69 |
| 8,303,221 B2 * | 11/2012 | Lenz | B60P 7/15 | 410/121 |
| 8,313,278 B2 * | 11/2012 | Simmons | B60P 7/08 | 414/535 |
| 8,342,785 B1 * | 1/2013 | Ingles | B60P 7/13 | 410/77 |
| 8,388,038 B2 * | 3/2013 | Hastings | B60R 19/54 | 296/3 |
| 8,393,666 B1 * | 3/2013 | Rhoton | B60P 7/0807 | 296/43 |
| 8,415,829 B2 * | 4/2013 | Di Cristofaro | H02B 7/06 | 307/39 |
| 8,419,110 B2 * | 4/2013 | Katz | B62D 33/046 | 296/186.1 |
| 8,490,806 B2 * | 7/2013 | Yurgevich | B60P 1/6481 | 410/82 |
| 8,777,324 B2 * | 7/2014 | Wink | B60P 1/286 | 298/24 |
| 8,789,635 B2 * | 7/2014 | Franzen | B60L 15/38 | 180/68.5 |
| 8,851,488 B2 * | 10/2014 | Carruyo | B62B 1/12 | 410/52 |
| 8,864,165 B2 * | 10/2014 | Thomas | B60D 1/485 | 280/480 |
| 8,954,237 B2 * | 2/2015 | Gaussin | B62D 61/00 | 280/412 |
| 8,960,468 B2 * | 2/2015 | Boivin | B65D 19/42 | 220/4.31 |
| 8,985,664 B2 * | 3/2015 | Bermes | B62D 63/062 | 410/116 |
| 9,163,395 B2 * | 10/2015 | Finney | E04H 9/00 | |
| 9,316,408 B2 * | 4/2016 | Justus | F24H 9/148 | |
| 9,403,567 B2 * | 8/2016 | Bermes | B62D 63/062 | |
| 9,476,164 B2 * | 10/2016 | Penland, Jr. | B32B 21/12 | |
| 9,481,512 B2 * | 11/2016 | Diniaco | B60P 1/6418 | |
| 9,499,203 B1 * | 11/2016 | Finley | B62D 29/043 | |
| 9,527,426 B2 * | 12/2016 | Lavmand | B60P 3/42 | |
| 9,540,050 B2 * | 1/2017 | Miller | B60J 7/141 | |
| 9,610,813 B2 * | 4/2017 | McCoy | B60D 1/52 | |
| 9,656,699 B1 | 5/2017 | Polgrean | | |
| 9,656,701 B2 | 5/2017 | Booher et al. | | |
| 9,663,013 B2 | 5/2017 | Chen et al. | | |
| 9,688,212 B2 | 6/2017 | Endrasik | | |
| 9,688,317 B1 | 6/2017 | Berger | | |
| 9,701,464 B2 | 7/2017 | Kochanowski | | |
| 9,702,175 B2 | 7/2017 | Jaworski et al. | | |
| 9,708,119 B2 | 7/2017 | Disorbo | | |
| D793,911 S | 8/2017 | Yim et al. | | |
| 9,731,658 B2 | 8/2017 | Kowalski | | |
| 9,738,465 B2 | 8/2017 | Berghammer | | |
| 9,745,003 B2 | 8/2017 | Kloepfer et al. | | |
| 9,751,161 B2 | 9/2017 | Stewart et al. | | |
| 9,764,674 B2 | 9/2017 | Friesen et al. | | |
| 9,764,780 B2 | 9/2017 | Zehner et al. | | |
| D801,229 S | 10/2017 | Brock | | |
| 9,776,659 B2 | 10/2017 | Frick | | |
| 9,783,238 B2 | 10/2017 | Garceau | | |
| 9,783,377 B2 | 10/2017 | Clark et al. | | |
| 9,789,799 B2 | 10/2017 | Pawluk | | |
| 9,789,801 B2 | 10/2017 | Maertens et al. | | |
| 9,789,803 B2 | 10/2017 | Ellement | | |
| 9,796,438 B1 | 10/2017 | Bennett et al. | | |
| 9,802,450 B2 | 10/2017 | Mathews et al. | | |
| D801,874 S | 11/2017 | Warren et al. | | |
| D803,102 S | 11/2017 | Pletcher | | |
| 9,849,738 B2 * | 12/2017 | Guthard | B62D 53/0828 | |
| 9,862,297 B2 | 1/2018 | Dagenais et al. | | |
| 9,868,380 B2 | 1/2018 | Peterson et al. | | |
| 9,868,589 B2 | 1/2018 | Disorbo | | |
| 9,896,017 B1 | 2/2018 | Requejo et al. | | |
| 9,902,224 B2 | 2/2018 | Rathman | | |
| D811,986 S | 3/2018 | Torres | | |
| D813,101 S | 3/2018 | Devine et al. | | |
| 9,908,723 B2 * | 3/2018 | Disorbo | B60P 1/4421 | |
| 9,925,910 B2 | 3/2018 | Hornung | | |
| 9,932,078 B1 | 4/2018 | Nehring | | |
| 9,932,140 B2 | 4/2018 | Lindley et al. | | |
| 9,943,024 B2 | 4/2018 | Loen | | |
| 9,944,154 B2 * | 4/2018 | Singer | B60J 7/041 | |
| 9,944,457 B2 | 4/2018 | Bowser | | |
| 9,944,458 B2 | 4/2018 | Bowser | | |
| 9,945,753 B2 | 4/2018 | Nelson | | |

(56) References Cited

U.S. PATENT DOCUMENTS

| | | |
|---|---|---|
| 9,950,676 B1 | 4/2018 | Cergnul |
| 9,963,079 B2 | 5/2018 | Hack et al. |
| 9,969,314 B2 | 5/2018 | Jones |
| 9,969,318 B2 | 5/2018 | Lanigan et al. |
| 9,987,894 B2 | 6/2018 | Dagenais et al. |
| 9,988,113 B2 * | 6/2018 | Habernegg .......... B62D 63/061 |
| D823,170 S | 7/2018 | Finney et al. |
| D826,691 S | 8/2018 | Peterse et al. |
| D826,786 S | 8/2018 | Denton, III |
| D826,787 S | 8/2018 | Goral |
| 10,046,884 B1 | 8/2018 | Erschen et al. |
| 10,053,170 B2 | 8/2018 | Boggess |
| 10,059,394 B2 | 8/2018 | Robarge |
| 10,059,510 B2 | 8/2018 | Kelly |
| 10,059,538 B1 | 8/2018 | Haub et al. |
| 10,059,571 B2 | 8/2018 | Scheer |
| 10,071,757 B1 | 9/2018 | Cheatham et al. |
| 10,081,402 B1 | 9/2018 | Davis |
| 10,124,845 B1 | 11/2018 | Boltz |
| 10,131,264 B2 | 11/2018 | Sailer |
| D836,037 S | 12/2018 | Tran |
| D836,492 S | 12/2018 | Wagers |
| 10,155,529 B2 | 12/2018 | Bjorkman et al. |
| 10,160,297 B2 | 12/2018 | Poyntz |
| 10,160,373 B2 | 12/2018 | Tovornik |
| 10,207,753 B2 | 2/2019 | O'Marra et al. |
| 10,221,022 B2 | 3/2019 | Campbell et al. |
| 10,232,758 B1 | 3/2019 | Davis |
| 10,239,711 B2 | 3/2019 | Herman et al. |
| D845,176 S | 4/2019 | McElwain |
| D847,037 S | 4/2019 | Hancock |
| 10,246,024 B2 | 4/2019 | Jay et al. |
| 10,259,511 B2 | 4/2019 | Sponselee |
| 10,272,815 B2 | 4/2019 | Ceuster |
| 10,273,708 B2 | 4/2019 | Holst et al. |
| 10,274,134 B2 | 4/2019 | Sloan et al. |
| D848,903 S | 5/2019 | Armigliato et al. |
| 10,286,966 B2 | 5/2019 | Booher |
| 10,301,787 B2 | 5/2019 | Groeneweg |
| D850,327 S | 6/2019 | Adams |
| 10,308,087 B1 | 6/2019 | Frosch et al. |
| 10,308,158 B2 | 6/2019 | Quenzi et al. |
| 10,322,661 B2 | 6/2019 | Babington et al. |
| 10,328,838 B2 | 6/2019 | Yim et al. |
| 10,329,087 B2 | 6/2019 | Holman |
| 10,337,908 B2 | 7/2019 | Reichow et al. |
| 10,339,491 B2 | 7/2019 | Wakim et al. |
| 10,351,071 B2 | 7/2019 | Hack et al. |
| 10,351,297 B2 | 7/2019 | Riper et al. |
| 10,358,023 B2 * | 7/2019 | Hegewald .............. B60L 58/26 |
| 10,364,065 B2 | 7/2019 | Raninen et al. |
| 10,369,917 B2 | 8/2019 | Reid |
| 10,384,504 B2 | 8/2019 | Nozzarella |
| 10,399,405 B2 | 9/2019 | Osborne et al. |
| 10,405,516 B2 | 9/2019 | Niemela et al. |
| 10,407,007 B2 | 9/2019 | Wang |
| 10,414,322 B1 | 9/2019 | Coulter |
| D864,032 S | 10/2019 | Bernard |
| D864,033 S | 10/2019 | Devine et al. |
| D864,034 S * | 10/2019 | Hill ............... D12/103 |
| D864,035 S | 10/2019 | Hill et al. |
| D864,036 S | 10/2019 | Hill et al. |
| D864,037 S | 10/2019 | Hill et al. |
| 10,427,581 B2 * | 10/2019 | Boisture ................ B60P 3/40 |
| 10,427,725 B2 | 10/2019 | Banerjee et al. |
| 10,427,726 B2 | 10/2019 | Maertens et al. |
| 10,442,280 B2 | 10/2019 | Lees et al. |
| 10,457,504 B2 | 10/2019 | Herman et al. |
| D865,571 S | 11/2019 | Reinero |
| D866,401 S * | 11/2019 | Arter ............... D12/102 |
| D867,215 S | 11/2019 | Wyk |
| D867,216 S | 11/2019 | Wyk |
| D867,217 S | 11/2019 | Arter et al. |
| D867,218 S | 11/2019 | Arter et al. |
| D867,934 S | 11/2019 | Gaesser |
| 10,464,496 B2 | 11/2019 | Jones, Jr. et al. |
| 10,464,607 B1 | 11/2019 | Hill et al. |
| 10,472,166 B2 * | 11/2019 | Bloom ................ B65D 90/14 |
| 10,479,257 B1 | 11/2019 | Fraley et al. |
| 10,486,748 B2 | 11/2019 | Deckard et al. |
| D869,993 S | 12/2019 | Sagen et al. |
| 10,507,875 B1 * | 12/2019 | Ebnöther ............. B32B 15/18 |
| 10,513,393 B2 | 12/2019 | Salih et al. |
| 10,538,420 B1 | 1/2020 | Kuebler |
| 10,654,391 B2 * | 5/2020 | Greiner ................ B60P 7/13 |
| 10,947,036 B2 * | 3/2021 | Helou, Jr. ............ B65D 88/022 |
| 11,266,958 B2 * | 3/2022 | Bishop ................ B01F 33/5013 |
| 2003/0155748 A1 * | 8/2003 | Picard ................ B62D 21/20 |
| | | 280/656 |
| 2004/0083671 A1 * | 5/2004 | Johnson ............ B65D 90/0086 |
| | | 52/511 |
| 2008/0111348 A1 * | 5/2008 | Lawson ................ B60D 1/143 |
| | | 280/504 |
| 2009/0297305 A1 * | 12/2009 | Autrey ................ B60P 1/28 |
| | | 414/425 |
| 2010/0191615 A1 * | 7/2010 | Thomas ............. B65D 90/008 |
| | | 52/27 |
| 2016/0185128 A1 * | 6/2016 | Cloots .................. B41J 3/4073 |
| | | 347/9 |
| 2022/0220758 A1 * | 7/2022 | Tiramani ............ E04B 1/34315 |
| 2022/0255402 A1 * | 8/2022 | Warren ................ H02K 7/1823 |

* cited by examiner

TRAILER AND INTERCHANGEABLE MODULES

CROSS-REFERENCE TO RELATED APPLICATIONS

This application claims priority to U.S. Provisional Patent Application No. 62/985,931, filed on Mar. 6, 2020, the entirety of which is hereby incorporated herein by reference.

FIELD OF THE INVENTION

This invention relates generally to a device for transporting goods. In particular, this invention provides for a customizable trailer capable of securing and transporting one or more interchangeable modules.

BACKGROUND

Many styles of dedicated trailers are commercially available at a wide range of prices; however, even the simplest dedicated trailers can cost thousands of dollars. For most people, a dedicated trailer is used only occasionally for its intended use, and is stored unused for the majority of the year. If a trailer owner wishes to move a large or heavy item such as an air compressor or other large piece of machinery not on the dedicated trailer, then a separate trailer would be required as well as additional storage space for storing the equipment and trailer when it is not in use. To make the most efficient use of storage space and equipment owned, a trailer that can be reconfigured to accommodate any number of interchangeable modules is desired.

Flatbed trailers in many sizes and configurations are available for transporting a wide variety of goods on public and private roadways. However, a flatbed trailer consists of a simple flat surface, and tie straps, bungee cords, chains, and other similar devices are needed to secure items to a flatbed trailer to avoid loss and damage to the item and to other vehicles. Straps and the like may move relative to the item being secured during transport; therefore, drivers must stop periodically to check that items remain securely tied down to the flatbed trailer and readjust the tie-down devices to ensure that items remain securely tied down to the flatbed trailer. For at least these reasons, a system for securely attaching items to a trailer is desired.

BRIEF SUMMARY

In accordance with various embodiments of the invention, a trailer with detachable fenders and interchangeable modules configured for mounting on the trailer are provided. In one embodiment, a single module trailer and removable camper box attachment are disclosed. In another embodiment, a single module trailer and interchangeable module on which equipment may be attached are disclosed. In all embodiments described, the same trailer may be used as a base to accommodate a camper box or any configuration or number of modules.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the apparatus are not shown in one or more of the figures for clarity and to facilitate explanation of embodiments of the present invention.

Trailer

Figure 1:
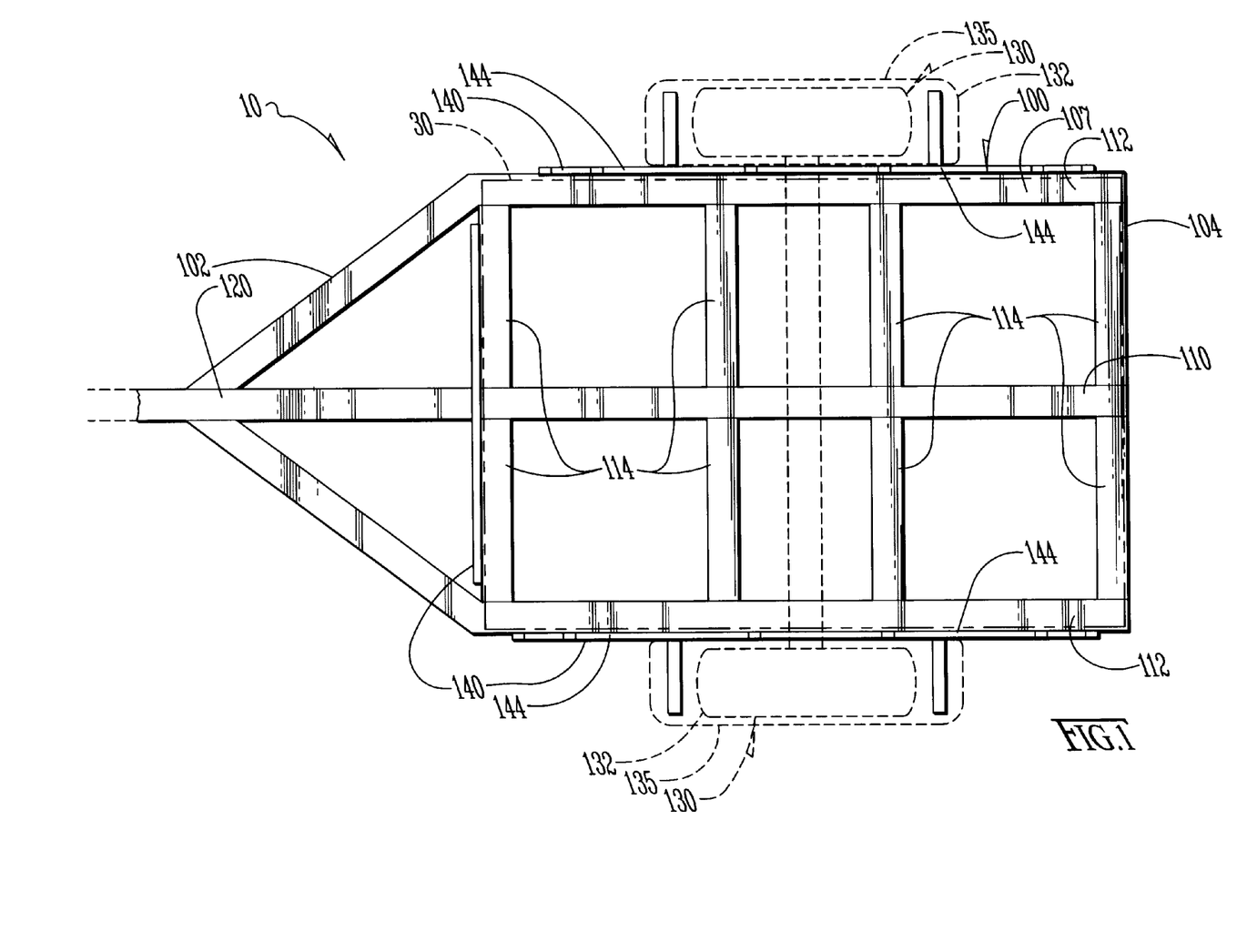
FIG. 1 illustrates a top view of a trailer in accordance with an embodiment of the invention.
Figure 2:
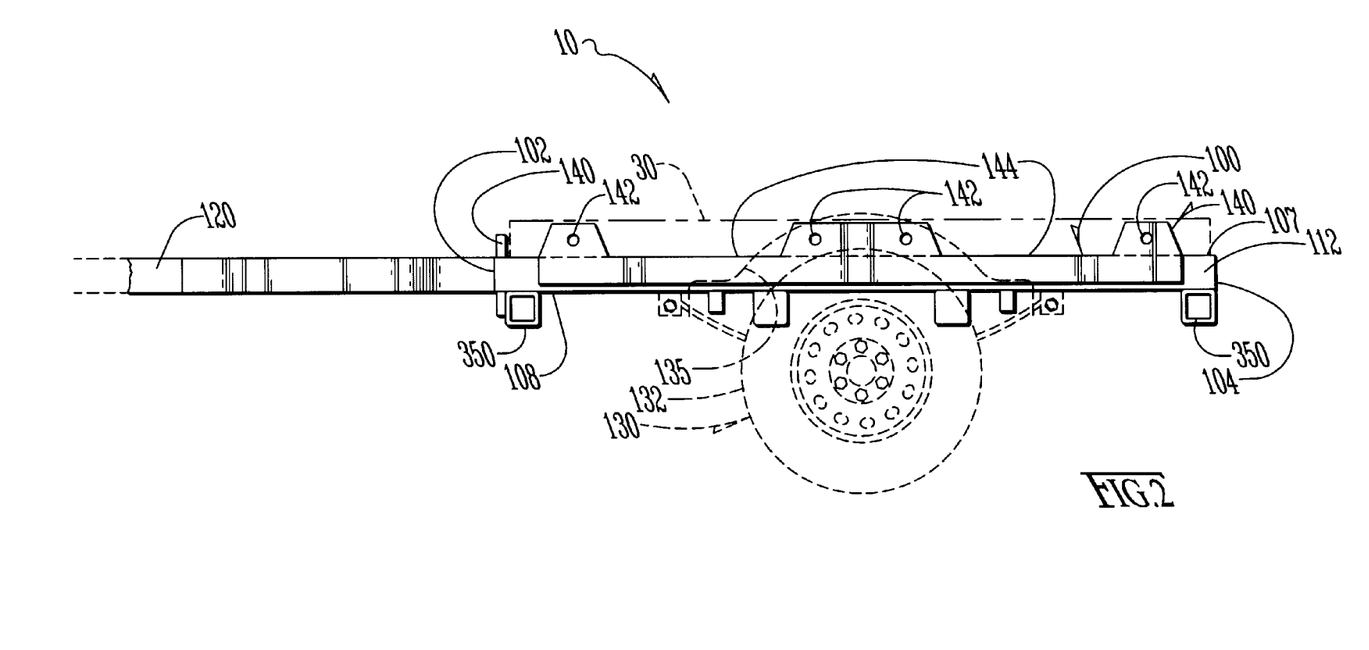
FIG. 2 illustrates a side view of a trailer in accordance with an embodiment of the invention.

In accordance with one embodiment, FIGS. 1 and 2 illustrate a trailer 10 used for transporting modules 30 from one location to another on public and private roadways. Trailer 10 has a front end 102 and a back end 104. Trailer 10 comprises a bed 100 having a top side 107 and a bottom side 108. Bed 100 comprises a generally rectangular and generally horizontal area on which modules 30 can be placed and secured. As shown, bed 100 comprises a central beam 110 two side beams 112 that are generally parallel to central beam 110, and eight cross beams 114 wherein four cross beams 114 connect the first side beam 112 to central beam 110 and the other four cross beams 114 connect the second side beam 112 to central beam 110. However, any other arrangement of beams may be used to form a generally rectangular and generally horizontal bed 100 without departing from the scope of this disclosure. Bed 100, central beam 110, side beams 112, and cross beams 114 may be steel, wood, metal, or any other material suitable for securing and supporting heavy loads.

Central beam 110 extends forward toward the front end 102 and beyond the generally rectangular area formed by side beams 112 and cross beams 114, and comprises a hitch 120 at its furthest forward point that connects trailer 10 to a vehicle. As shown, hitch 120 comprises a tongue configured to fit around a hitch point of a vehicle and be secured with a hitch pin, clevis, or similar device; however, any other type of hitch used to secure a trailer to a vehicle may be used without departing from the scope of the disclosure.

Trailer 10 further comprises a wheel assembly 130. Wheel assembly 130 comprises a two or more wheels 132 and supporting structure for attaching wheel 132 to bed 110 and allowing wheels 132 to rotate as trailer 10 is moved.

Trailer 10 further comprises detachable fenders 135 attached to bed 100 or wheel assembly. Fenders 135 surround, but to not touch wheels 132. Fenders 135 protect wheels 132 from damage, and also prevent mud and debris from being flung as trailer 10 moves. Fenders 135 may be constructed of metal, plastic, or any other suitable material. Because fenders 135 are detachable, an operator can get closer to trailer 10 with a forklift or other machinery to load a module 30 on the trailer 10.

Trailer 10 further comprises a steel belt 140 comprising a narrow strip of steel that extends completely or partially around the perimeter of the generally rectangular area formed by side beams 112 and cross beams 114. For example, steel belt 140 may extend: from first point on a first side beam 112, to a second point on the first side beam 112 that is near the back end 104 of trailer 10, across the entire length of both cross beams 114 at the back end 104 of trailer 10, and to a point on the second side beam 112 to form a generally rectangular area encircled by steel belt 140. For another example, steel belt 140 may extend completely or partially along the length of each side beam 112. Steel belt 140 overlaps and is secured to outer sides of side beams 112 and the outermost cross beams 114. Steel belt 140 may be secured to side beams 112 or the outermost cross beams 114 by welding, bolts, or other means of securely attaching a metal object to another object. Steel belt 140 may have one or more attachment points 142 spaced along its length. The attachment points 142 may comprise holes through which hitch pins, bolts, or other attachment devices may be inserted to secure items placed on bed 100 to be hauled by trailer 10. Attachment points 142 may comprise holes that are round, square, hexagonal, or any other shape without departing from the scope of this disclosure. Steel belt 140 may also comprise notches 144 along its length. Notches 144 are of sufficient size and spacing to allow forklift tines to pass through steel belt 140 to place equipment 80 on bed 100 without interfering with steel belt 140. As shown, two notches 144 are disposed on each side of steel belt 140; however, additional notches 144 may be disposed within steel belt 140 to allow multiple equipment 80 to be placed on bed 100 or to allow equipment 80 to be placed in multiple locations on bed 100.

Module

Figure 3:
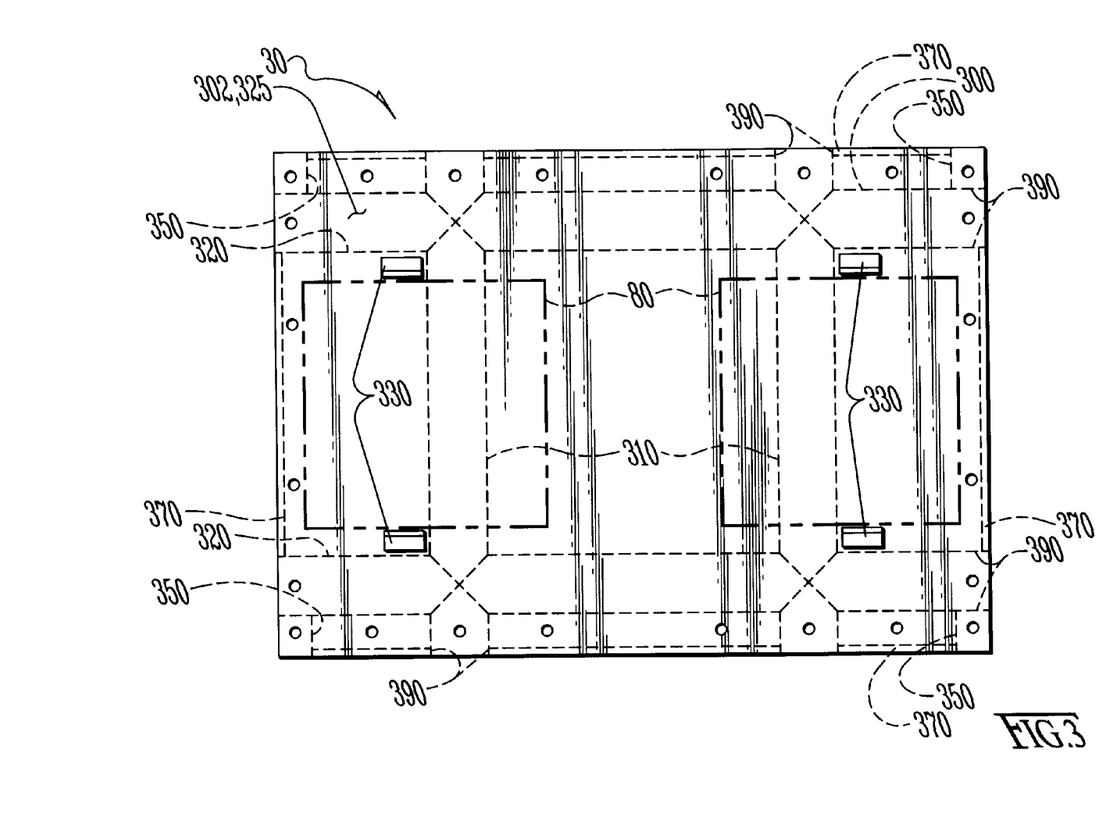
FIG. 3 illustrates a top view of the inner structure of a module in accordance with an embodiment of the invention.
Figure 4:
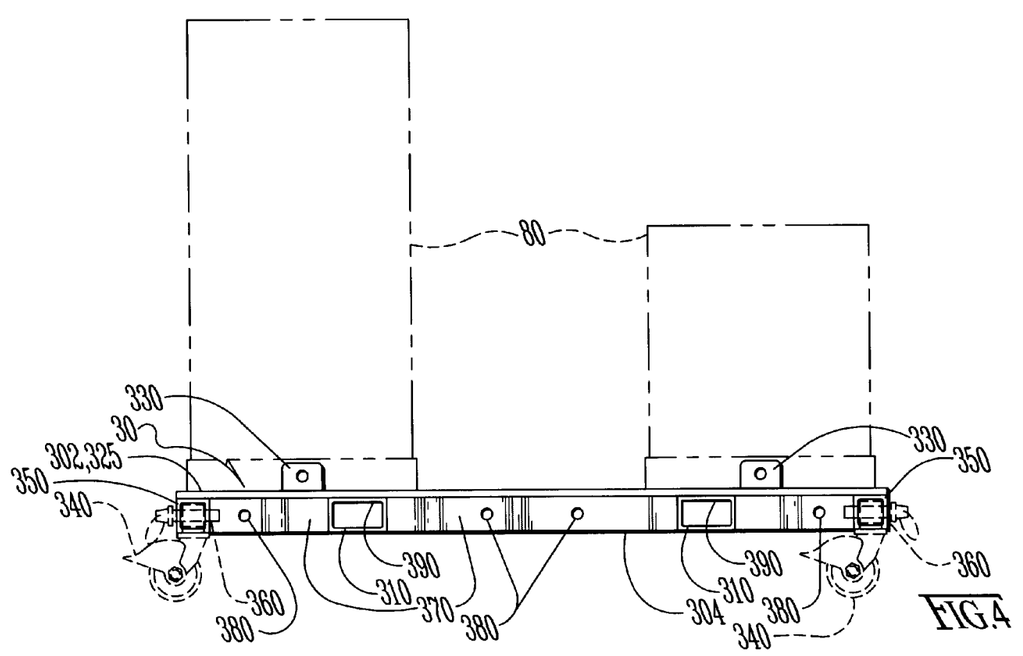
FIG. 4 illustrates a side view of a module in accordance with an embodiment of the invention.
Figure 8:
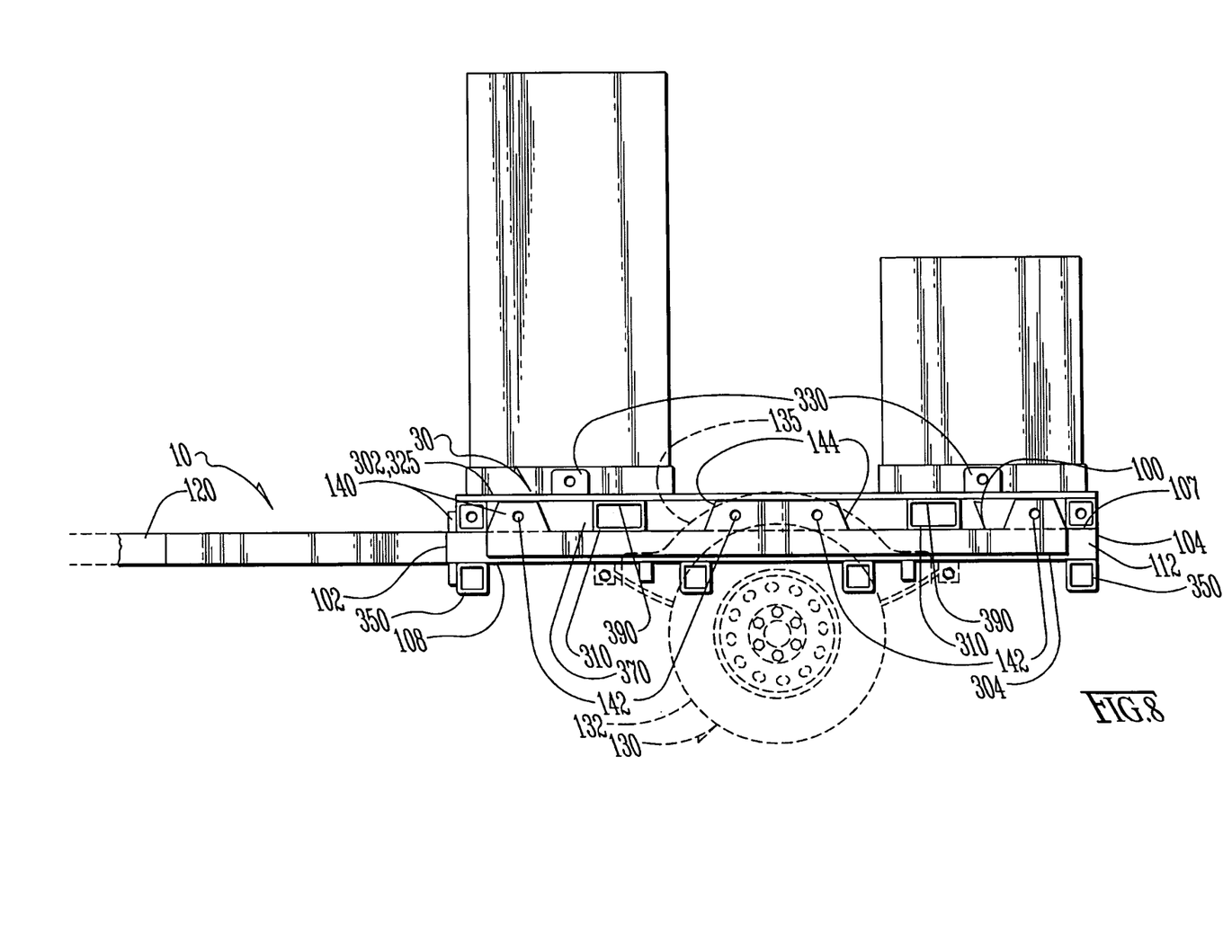
FIG. 8 illustrates a trailer and module holding equipment in accordance with an embodiment of the invention.

In accordance with one embodiment, FIGS. 3, 4, and 8 illustrate a module 30 used for transporting equipment 80 from one location to another on public and private roadways. One or more modules 30 may be placed on and secured to a trailer 10 for transport of equipment 80. Module 30 provides a base on which a camper box 70 or equipment 80 such as large machinery can be secured for transport using trailer 10. Module 30 has a top side 302 and a bottom side 304.

Module 30 comprises a support structure 300 that provides a sturdy structure for inserting forklift tines and lifting module 30 and any equipment 80 placed on module 30. Support structure 300 comprises a generally symmetric structure having first and second longitudinal tubes 310 wherein the first longitudinal tube 310 is generally parallel to the second longitudinal tube 310. Support structure 300 further comprises first and second cross tubes 320 wherein the first cross tube 320 is generally parallel to the second cross tube 320, and first and second cross tubes 320 are generally perpendicular to first and second longitudinal tubes 310. The spacing between first and second longitudinal tubes 310 and between first and second cross tubes 320 is such that standard forklift tines can be inserted into the support structure 300 through open ends of first and second longitudinal tubes 310 or first and second cross tubes 320. Support structure 300 may be constructed using hollow metal tubing having a generally square or generally rectangular cross section. For example, support structure 300 may be constructed from aluminum or steel tubing with a cross section that forms an approximately 2 inch by 6 inch rectangle. Metal tubular sections may be cut at 45 degree angles and welded together such that first and second longitudinal tubes 310 and first and second cross tubes 320 are joined together at 90 degree angles and form a lattice structure as shown.

A cover 325 may be welded or otherwise attached to the support structure 300. Cover 325 protects support structure 300 and other parts of module 30 and provides a surface for attaching mounting brackets 330. Cover 325 may comprise sheet metal, wood, or another material suitable for attachment to module 30.

Mounting brackets 330 may be welded or otherwise attached to the support structure 300 or cover 325. Mounting brackets 330 provide a rigid structure for attaching equipment 80 to module 30. For example, equipment 80 may comprise an air compressor or another large piece of equipment 80 that may be bolted or otherwise attached to mounting brackets 330, thus attaching equipment 80 to module 30. Mounting brackets 330 may be formed from angle iron, another metal, or another material capable of being securely attached to support structure 300. Mounting brackets 330 may feature holes for inserting bolts, lock pins, or similar fasteners suitable for attaching equipment 80 to mounting brackets 330. While four mounting brackets 330 in a particular configuration are shown in the figures, any number or configuration of mounting brackets 330 may be attached to support structure 300 or cover 325 for mounting equipment 80.

One or more receiver hitches 350 may be mounted to support structure 300 at the corners of module 30. A receiver hitch 350 may be welded, bolted, or similarly attached to a tube 310 or cross tube 320 to securely attach the receiver hitch 350 to the support structure 300. Receiver hitch 350 may comprise a standard hitch receptacle such as a 2 inch hitch receptacle, or a metal or wooden block with one or more holes 360 through which bolts, lock pins, or other fasteners may be inserted to secure module 30 to trailer 10.

Module 30 further comprises a steel band 140 comprising a narrow strip of steel that extends completely or partially around the perimeter of the generally rectangular area formed by support structure 300. Steel band 370 may be secured to the support structure 300 of module 30 by welding, bolts, or other means of securely attaching a metal object to another object. Steel band 370 may have one or more holes 380 spaced along its length. The holes 380 in the steel band 370 may generally align with the holes 360 in the receiver hitches 350. Hitch pins, bolts, or other attachment devices may be inserted into holes 380 to secure a module 30 to trailer 10. The holes 380 may be round, square, hexagonal, or any other shape without departing from the scope of this disclosure. Steel band 370 may also comprise notches 390 along its length. Notches 390 are of sufficient size and spacing to allow forklift tines to pass through steel band 370 without interfering with steel band 370. As shown, two notches 390 are disposed on each side of steel band 370; however, additional notches 390 may be disposed within steel band 370.

It is envisioned that a person could own several modules 30, each with a different piece of equipment 80 mounted to a dedicated module 30 using mounting brackets 330. Each piece of equipment 80 can be stored on its dedicated module 30 until needed and then easily transported to trailer 10. Casters 340 may be attached to the bottom of module 30 onto receiver hitch 350 allowing equipment 80 to be easily rolled. When a particular piece of equipment 80 is needed, it can be lifted by inserting the tines of a forklift into the open ends of first and second longitudinal tubes 310 or first and second cross tubes 320, transported to trailer 10, placed on the bed 100 of trailer 10, and secured to the steel belt 140 of trailer 10 using bolts, lock pins, or other mounting hardware. Several modules 30 may be placed on the bed 100 of trailer 10 concurrently. In addition, modules 30 may be stacked. Having been secured to trailer 10, the piece of equipment 80 can then be transported over public or private roadways to another location. Once trailer 10 arrives at the other location, module 30 and any equipment 80 mounted to it may be removed from the trailer 10 by a forklift, crane, or other equipment 80 and placed where it is needed on a job site.

Retrofit Kit

Figure 5:
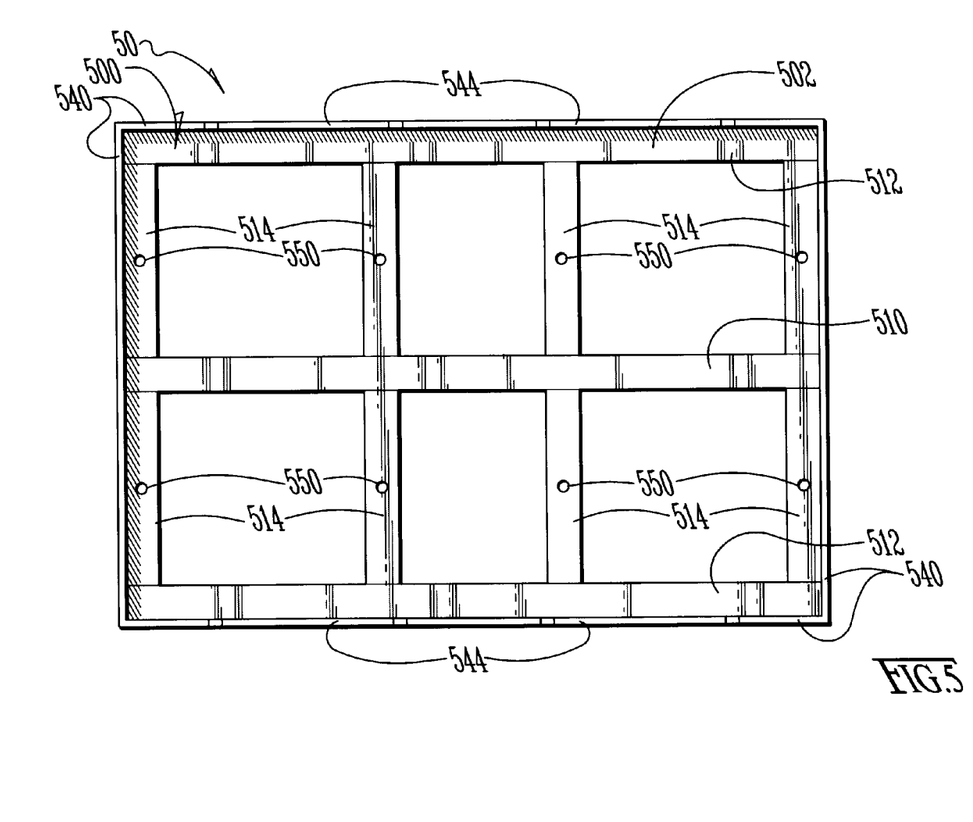
FIG. 5 illustrates a top view of a trailer retrofit kit in accordance with an embodiment of the invention.
Figure 6:
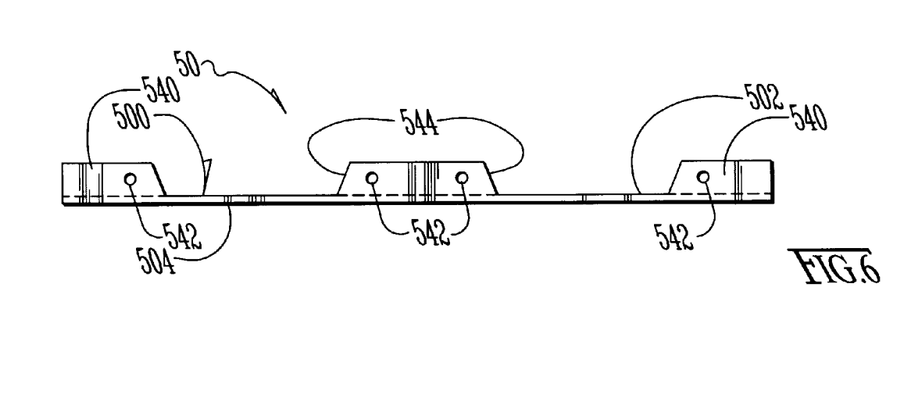
FIG. 6 illustrates a side view of a trailer retrofit kit in accordance with an embodiment of the invention.

In accordance with one embodiment, FIGS. 5 and 6 illustrate a retrofit kit 50 used for transporting items from one location to another on public and private roadways. Retrofit kit 50 may be attached to a pre-existing trailer such as a flatbed trailer to allow one or more modules 30 to be attached to the pre-existing trailer. Alternatively, retrofit kit 50 may be attached to the bed of a pre-existing flatbed truck or placed in the bed of a pre-existing truck such as a pickup truck. Retrofit kit 50 comprises a bed 500 having a top side 502 and a bottom side 504. Bed 500 comprises a generally rectangular and generally horizontal area on which items can be placed and secured. As shown, bed 500 comprises a central beam 510 two side beams 512 that are generally parallel to central beam 510, and eight cross beams 514 wherein four cross beams 514 connect the first side beam 512 to central beam 510 and the other four cross beams 514 connect the second side beam 512 to central beam 510. However, any other arrangement of beams or plate may be used to form a generally rectangular and generally horizontal bed 500 without departing from the scope of this disclosure. Cross beams 514 may feature a number of holes 550 for attaching retrofit kit 50 to a pre-existing trailer or truck. While eight evenly spaced holes 550 are shown in cross beams 514 in a particular configuration, any arrangement of holes 550 in cross beams 514, central beam 510, side beams 512 may be used. Bed 500, central beam 510, side beams 512, and cross beams 514 may be steel, wood, metal, or any other material suitable for securing and supporting heavy loads. The bottom side 504 of bed 500 may be secured to a pre-existing trailer or truck using bolts or similar fastener.

Retrofit kit 50 further comprises a steel belt 540 comprising a narrow strip of steel that extends completely or partially around the perimeter of the generally rectangular area formed by side beams 512 and cross beams 514. Steel belt 540 overlaps and is secured to outer sides of side beams 512 and the outermost cross beams 514. Steel belt 540 may be secured to side beams 512 or the outermost cross beams 514 by welding, bolts, or other means of securely attaching a metal object to another object. Steel belt 540 may have one or more attachment points 542 spaced along its length. The attachment points 542 may comprise holes through which hitch pins, bolts, or other attachment devices may be inserted to secure items placed on bed 500 to be hauled by a trailer onto which retrofit kit 50. Attachment points 542 may comprise holes that are round, square, hexagonal, or any other shape without departing from the scope of this disclosure. Steel belt 540 may also comprise notches 544 along its length. Notches 544 are of sufficient size and spacing to allow forklift tines to pass through steel belt 540 to place items on bed 500 without interfering with steel belt 540. As shown, two notches 544 are disposed on each side of steel belt 540; however, additional notches 544 may be disposed within steel belt 540 to allow multiple items to be placed on bed 500 or to allow items to be placed in multiple locations on bed 500.

Multiple layers of modules could be placed on a trailer 10 or a pre-existing truck or pre-existing trailer by securing a retrofit kit 50 to the upper ends of generally vertical support beams that are secured to the bed 100 of a trailer 10 or to the bed 500 of a retrofit kit at the lower end of the generally vertical support beams.

It is envisioned that a person could own several modules 30, each with a different piece of equipment 80 mounted to a dedicated module 30 using mounting brackets 330. Each piece of equipment 80 can be stored on its dedicated module 30 until needed and then easily transported to a truck or trailer with one or more retrofit kits 50 mounted on it. When a particular piece of equipment 80 is needed, it can be lifted by inserting the tines of a forklift into the open ends of first and second longitudinal tubes 310 or first and second cross tubes 320, transported to a truck or trailer with one or more retrofit kits 50 mounted on it, placed on the bed 500 of a retrofit kit 50, and secured to the steel belt 540 of retrofit kit 50 using bolts, lock pins, or other mounting hardware. Several modules 30 may be placed on the bed 500 concurrently. In addition, modules 30 may be stacked on the bed 500. Having been secured to the retrofit kit 50, the piece of equipment 80 can then be transported over public or private roadways to another location. Once the trailer arrives at the other location, module 30 and any equipment 80 mounted to it may be removed by a forklift, crane, or other equipment 80 and placed where it is needed on a job site.

Camper Box

Figure 7:
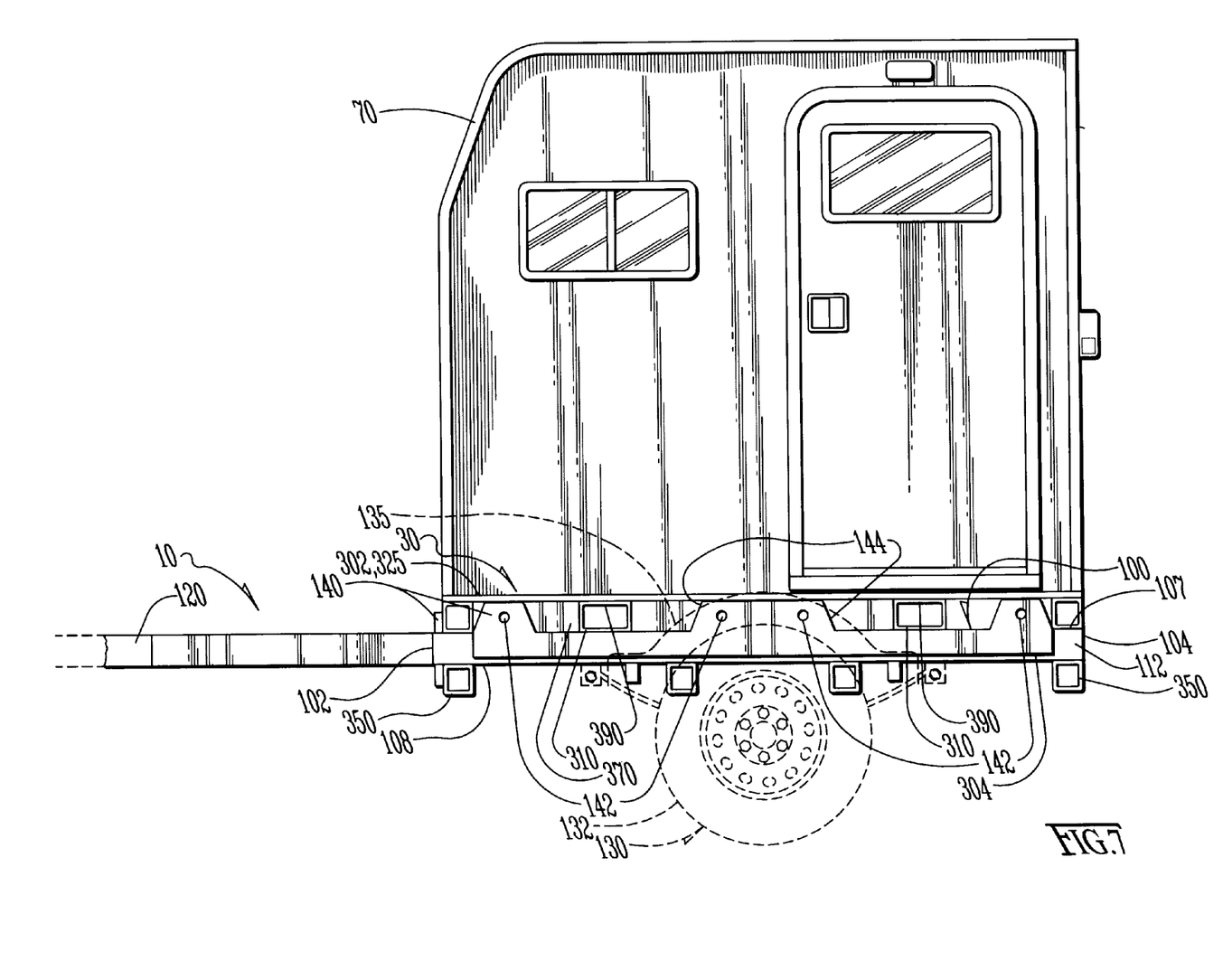
FIG. 7 illustrates a trailer and camper box attachment in accordance with an embodiment of the invention.

As shown in FIG. 7, a camper box 70 may be stored separately from trailer 10 or retrofit kit 50 until needed and then easily transported to trailer 10 or retrofit kit 50. Camper box 70 may be mounted to one or more modules 30. When camper box 70 is needed, it can be lifted by inserting the tines of a forklift into the open ends of first and second longitudinal tubes 310 or first and second cross tubes 320 of module 30, transported to trailer 10 or retrofit trailer kit 50, placed on the bed 100/500 of trailer 10 or retrofit kit 50, and secured to the steel belt 140/540 of trailer 10 or retrofit kit 50 using bolts, lock pins, or other mounting hardware. Having been secured to trailer 10 or retrofit kit 50, the camper box 70 can then be transported over public or private roadways to another location and used for camping purposes.

Spring-Loaded Covers

Figure 9:
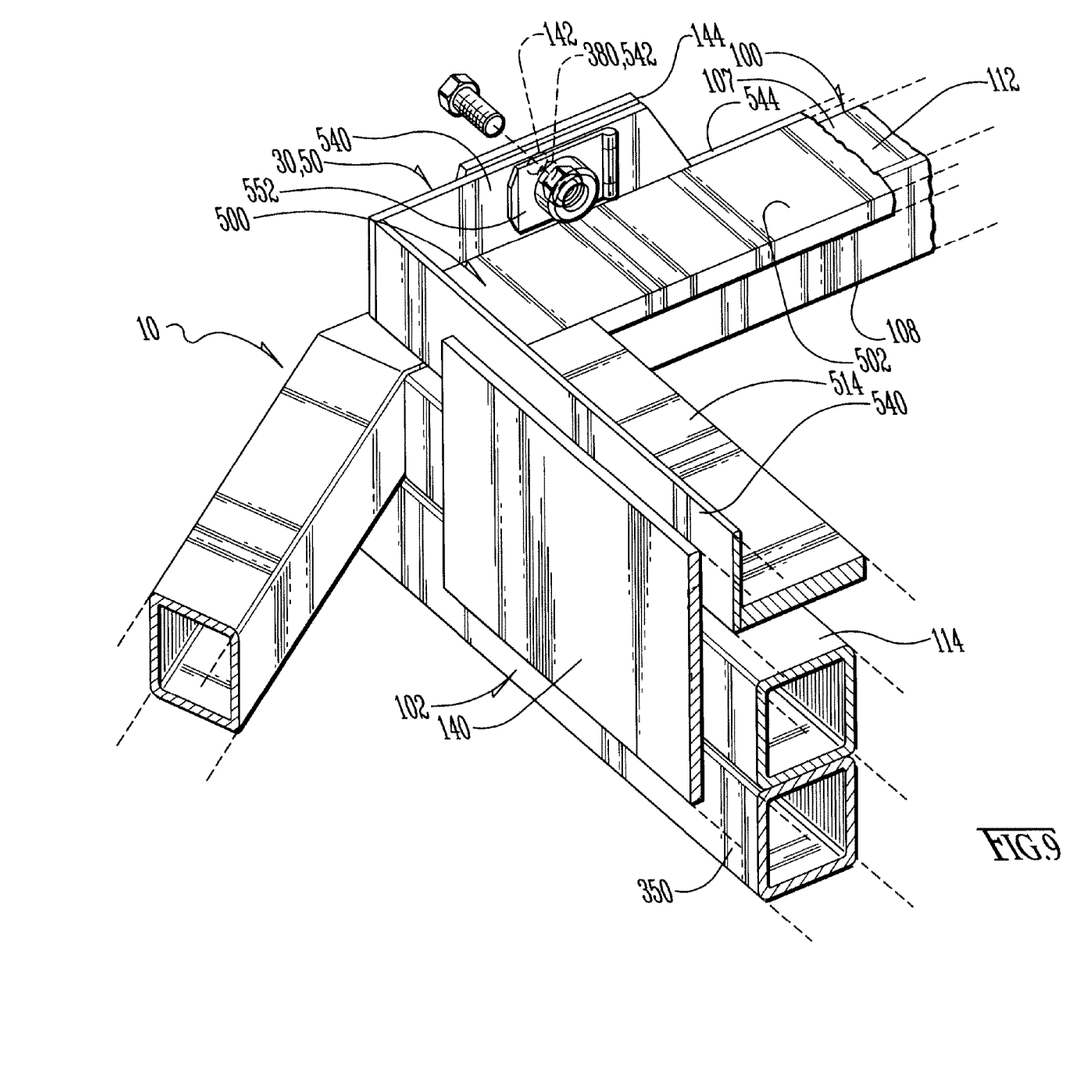
FIG. 9 illustrates a spring loaded cover in accordance with an embodiment of the invention.

Once a module 30 with equipment 80 attached to the module 30 has been placed onto trailer 10 or retrofit kit 50, it must be secured with a fastener. Typically, securing with a fastener requires being able to access both sides of the hole through which the fastener will be inserted. For example, securing an item with a bolt requires access to one side of the hole for the purpose of inserting the bolt and access to the other side of the hole for twisting a nut onto the bolt. For another example, access to one side of the hole may be required to insert a fastener, and access to the other side is needed to insert a pin into a hole in the fastener. Accessing both sides of the attachment points 142 or holes 360/380 may be difficult or impossible when a module 30 with equipment attached to the module 30 is placed on a trailer 10 or retrofit kit 50.

To allow for an easy and secure means for fastening modules 30 to a trailer 10 or retrofit kit 50, spring-loaded covers may be mounted to the bed 100/500 adjacent to attachment points 142. Each spring-loaded cover may be attached to the bed 100/500 with a hinge, and may be configured to be held in an open position or a closed position. When the spring-loaded cover is in an open position, a bolt or other fastener may be placed through attachment point 142 and/or a hole 360/380. The spring-loaded cover may then be closed, and the spring of the spring-loaded cover holds the spring-loaded cover tightly over the first end of the fastener, for example the head of a bolt, thus holding the fastener securely in place without securing the other end of the fastener. Through the use of a spring-loaded cover as described, module 30 and equipment 80 remain securely in place on the trailer 10 or retrofit kit 50.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for transporting one or more items on a public or private roadway comprising:
   a trailer having a front end, a back end, and a generally rectangular bed having an upper side, a bottom side, and a perimeter, the perimeter of the generally rectangular bed comprising a first side beam extending generally from the front end of the trailer to the back end of the trailer, a second side beam opposite and generally parallel to the first side beam extending generally from the front end of the trailer to the back end of the trailer, a first cross beam extending between the first side beam and the second side beam at the front end of the trailer, and a second cross beam extending between the first side beam and the second side beam at the back end of the trailer, the first cross beam and the second cross beam being generally parallel to each other and generally perpendicular to the first side beam and the second side beam;
   a first steel band mounted to the first side beam and extending generally from the front end of the trailer to the back end of the trailer, the first steel band having one or more holes along its length;
   a second steel band mounted to the second side beam and extending generally from the front end of the trailer to the back end of the trailer, the second steel band having one or more holes along its length;
   a third steel band mounted to the first cross beam and extending generally from the first side beam to the second side beam, the third steel band having one or more holes along its length,
   a fourth steel band mounted to the second cross beam extending generally from the first side beam to the second side beam, the fourth steel band having one or more holes along its length such that together the first steel band, second steel band, third steel band, and fourth steel band extend completely around the perimeter of the generally rectangular bed, and
the generally rectangular bed configured to support one or more modules that are configured to be removably mounted to the first steel band and the second steel band, wherein the modules are securely fastened to the first steel band and the second steel band by inserting one or more fasteners into the holes in the first steel band and the second steel band and into corresponding holes in the one or more modules.

2. The system of claim 1 wherein the first steel band, second steel band, third steel band, and fourth steel band each comprises one or more pairs of notches, the notches configured such that tines of a forklift can place items on the generally rectangular bed.

* * * * *